US009923820B2

United States Patent
Snapir et al.

(10) Patent No.: US 9,923,820 B2
(45) Date of Patent: Mar. 20, 2018

(54) END-TO-END QUALITY OF SERVICE AND FLOW CONTROL FOR ADAPTIVE CHANNELS

(75) Inventors: Dor Snapir, Tzafon (IL); Dubi Lever, Hashmonaim (IL); Isacc Ben Laish, Kfar Saba (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 797 days.

(21) Appl. No.: 12/560,874

(22) Filed: Sep. 16, 2009
(Under 37 CFR 1.47)

(65) Prior Publication Data

US 2010/0257259 A1 Oct. 7, 2010

Related U.S. Application Data

(60) Provisional application No. 61/097,360, filed on Sep. 16, 2008.

(51) Int. Cl.
*G06F 15/177* (2006.01)
*H04L 12/28* (2006.01)
(Continued)

(52) U.S. Cl.
CPC .............. *H04L 47/10* (2013.01); *H04L 47/18* (2013.01); *H04L 47/20* (2013.01); *H04L 47/24* (2013.01)

(58) Field of Classification Search
CPC . H04L 1/0003; H04L 12/40136; H04L 47/10; H04L 47/18; H04L 47/20;
(Continued)

(56) References Cited

U.S. PATENT DOCUMENTS 6,091,777 A * 7/2000 Guetz et al. ............. 375/240.11
6,163,766 A * 12/2000 Kleider et al. ................ 704/229
(Continued)

OTHER PUBLICATIONS

PCT/IB09/06834, International Search Report dated Feb. 1, 2010.
European Search Report, Application No. EP09814151.8, dated Oct. 7, 2011.

*Primary Examiner* — Daniel C Murray
*Assistant Examiner* — Kishin G Belani
(74) *Attorney, Agent, or Firm* — Banner & Witcoff, Ltd.

(57) ABSTRACT

Providing quality of service (QoS) for applications such as Voice over IP (VoIP) and enforcing service level agreements (SLA) are major requirement in any current and future communication networks. On the other hand, more communication networks are employing adaptive transmission mechanisms, such as DVB-S2 ACM in satellite communication networks. In non-adaptive networks, QoS enforcers use static bit rate configurations. However, using a static bit rate configuration in an adaptive network may result in underflow situations, during which it may not be possible to utilize the full capacity of the transmission channel and expensive resources may therefore be wasted, In addition, using a static bit rate configuration in an adaptive network may result in overflow situations, during which it may be necessary to drop user traffic packets and therefore quality of service may not be maintained. It is therefore imperative that QoS enforcers have knowledge of the network's available bit rate at all times. This invention describes a method for achieving exactly that.

13 Claims, 1 Drawing Sheet

(51) Int. Cl.
*H04N 7/12* (2006.01)
*H04W 40/00* (2009.01)
*H04L 12/801* (2013.01)
*H04L 12/813* (2013.01)
*H04L 12/851* (2013.01)

(58) Field of Classification Search
CPC .......... H04L 47/24; H04L 12/28; H04N 7/12; H04W 40/00; G06F 15/177
USPC ....................................................... 709/221
See application file for complete search history.

(56) References Cited

U.S. PATENT DOCUMENTS

| | | |
|---|---|---|
| 7,321,602 B2 | 1/2008 | Bae et al. |
| 7,450,602 B2 * | 11/2008 | Vazquez Castro ............ 370/412 |
| 8,681,888 B1 * | 3/2014 | Lee et al. ...................... 375/260 |
| 2002/0042836 A1 * | 4/2002 | Mallory ........................ 709/232 |
| 2002/0054578 A1 | 5/2002 | Zhang |
| 2003/0054816 A1 * | 3/2003 | Krebs et al. .................. 455/428 |
| 2003/0236080 A1 | 12/2003 | Kadous et al. |
| 2004/0008736 A1 | 1/2004 | Bae et al. |
| 2004/0062268 A1 | 4/2004 | Pendakur et al. |
| 2005/0047341 A1 | 3/2005 | Kim et al. |
| 2006/0045128 A1 | 3/2006 | Madour |
| 2009/0034467 A1 * | 2/2009 | Chakraborty et al. ........ 370/330 |
| 2009/0052323 A1 * | 2/2009 | Breynaert et al. ............. 370/235 |

* cited by examiner

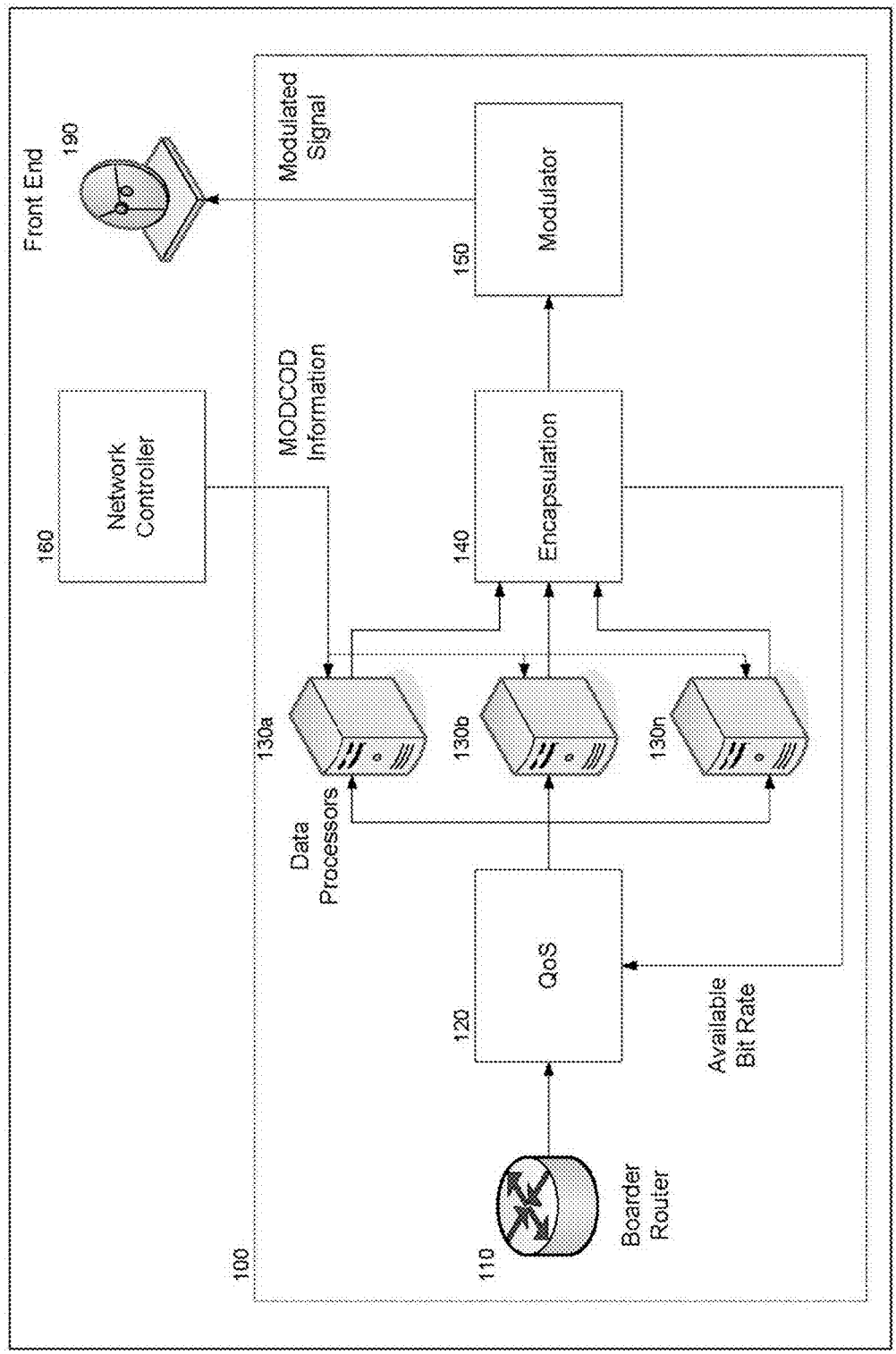

END-TO-END QUALITY OF SERVICE AND FLOW CONTROL FOR ADAPTIVE CHANNELS

RELATED APPLICATIONS

The present application is a non-provisional of U.S. Provisional application Ser. No. 61/097,360, filed Sep. 16, 2008, entitled "End-to-End QoS And Flow Control For Adaptive Channels," the contents of which are incorporated herein by reference in their entirety for all purposes.

TECHNICAL FIELD

This invention relates to the field of communication networks in general and more specifically to the fields of traffic engineering and quality-of-service providing and monitoring.

BACKGROUND

High speed data networks may be configured to support quality-of-service sensitive applications and/or to enforce service level agreements (SLA). These requirements may be satisfied through use of tight quality of service (QoS) monitoring and traffic engineering mechanisms. Therefore such networks may often be configured to use schedulers and other methods for distributing available bandwidth and/or capacity between users and applications according to priorities, weights, SLA, etc.

In another aspect, one characteristic of adaptive channels (e.g. DVB-S2 ACM) is dynamic user data throughput. While a channel's rate (i.e. the number of transmitted symbols per second) remains constant, user data throughput constantly changes according to the modulation and coding (MOD-COD) combinations being used for modulating the transmission carrier signal. User data throughput may change very rapidly in response to a sudden degradation in link conditions (e.g. rain fades over satellite links).

Introducing adaptive channels to high speed communication networks renders simple flow-control mechanisms and/or algorithms insufficient, especially in scenarios of rapid changes in user data throughput. In order to maintain quality of service (e.g. for real-time applications such as VoIP sessions) even when the total user data throughput has been significantly decreased, at least the QoS mechanism has to be constantly informed, in real-time, regarding the currently available user data throughput.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In aspects of this invention, a feedback mechanism may be used for at least the purpose of informing one or more QoS enforcers regarding the amount of available bandwidth and/or capacity over a transmission link or a channel, regardless of the current amount of user data being transmitted over that link (e.g. a link utilization ratio).

In another aspect of this invention, the available bandwidth and/or capacity may be calculated at any given time while user data may be transmitted over the transmission link or channel. Such calculation may be performed according to the average spectral efficiency by which data is transmitted over a transmission link or a channel at the time of calculation.

In yet another aspect of this invention, a QoS mechanism may be configured to forward traffic according to the available bandwidth and/or capacity it can actually send to the network.

BRIEF DESCRIPTION OF THE DRAWINGS

Having thus described the invention in general terms, reference will now be made to the accompanying drawings, which are not necessarily drawn to scale, and wherein:

FIG. 1 shows a block diagram of a communication network in accordance with the aspects of this invention.

DETAILED DESCRIPTION

FIG. 1 shows a block diagram of a communication network, which includes a transmission chain 100. Transmission chain 100 may be comprised of a boarder router 110, a QoS enforcer 120, one or more data processors 130a to 130n, an encapsulation function or an encapsulation device 140, and a modulator 150. Furthermore, as transmission chain 100 may be a part of a communication network, FIG. 1 also shows a network controller 160 and a front end unit 190.

Boarder router 110 may be configured to allow only selected traffic to enter the transmission chain, such as traffic destined to one or more receiving parties at the other end of the transmission channel. QoS enforcer 120 may be configured to at least provide flow control functionality by limiting the total data rate sent towards data processors 130a to 130n and thereafter towards encapsulation function 140. In some embodiments, QoS enforcer 120 may be replaced by a traffic engineering device or a traffic shaping device, which perform similar flow control functions.

One or more data processors 130a to 130n may be configured to receive user data and process it using one or more methods and/or algorithms, including but not limited to encryption algorithms, compression algorithms, acceleration methods and any other method which may be applicable for optimizing user traffic over the transmission link. Furthermore, data processors 130a to 130n may be configured to send the processed data towards encapsulating device 140, e.g. over an IP protocol. In some embodiments, one or more TCP and/or UDP tunnels may be used by each data processor in order to transfer different types of data (e.g. real-time information, multicast streams, non-real-time data, etc).

Encapsulation device 140 may be configured to at least receive user data information (e.g. over an IP protocol using one or more TCP and/or UDP tunnels), encapsulate it over an applicable transport stream (e.g. Baseband Frames for a DVB-S2 carrier in a satellite communication system) and provide the transport stream to modulator 150. Modulator 150 may be configured to at least modulate the transport stream using the applicable modulation technique and to output a modulated signal.

Though FIG. 1 shows encapsulation device 140 and modulator 150 as two different entities or devices, in some embodiments the encapsulation function may be integrated with the modulator in a single device. Both types of embodiments are consistent with the aspects of this invention.

Furthermore, in some embodiments, where no processing of the user data prior to transmission is required, data processors 130a to 130n may be either bypassed or absent from the transmission chain. In such embodiments, user data may be sent from QoS enforcer 120 directly to encapsulation device 140. This type of embodiments is also consistent with the aspects of this invention.

In yet further embodiments, the output of modulator 150 may be fed into a front-end 190, which may be configured to do any one or more of amplifying the modulated signal, changing the signal's carrier frequency, converting the signal to a different form (e.g. form electric form to electromagnetic form or to optic form) and any other function which may be required in order to actually have the signal transmitted over the designated media.

In some communication systems, modulator 150 and encapsulation device 140 may be configured to use one or more adaptive transmission techniques (e.g. DVB-S2 in satellite communication systems), whereby the spectral efficiency of the modulated signal may be modified on a frame-by-frame basis. If a receiving station has good reception conditions (i.e. the transmitted signal is received at high C/N ratio), modulator 150 may be indicated to modulate the data destined to that station using a modulation technique, which maps more bits into each transmitted symbol. Furthermore, encapsulation device 140 may be indicated in such a case to encode said data using weaker forward error correction (FEC) codes for at least the purpose of decreasing the number of transmitted bits used for FEC. On the other hand, if a receiving station has medium or poor reception conditions (i.e. the transmitted signal is received at low or minimal C/N ratio respectively), modulator 150 may be indicated to modulate the data destined to that station using a modulation technique, which maps less bits into each transmitted symbol. Furthermore, encapsulation device 140 may be indicated in such a case to use stronger FEC codes, which may impose higher overhead but also increase the probability of recovering the transmitted data at the receiving side.

In some embodiments, a network controller (e.g. network controller 160) may be configured to send and data processors 130a to 130n may be configured to receive information regarding a most efficient MODCOD combination that may be supported by a receiving party. Data processors 130a to 130n may be further configured to attach MODCOD information received from the network controller to every data packet sent towards encapsulation device 140, wherein said modulation and coding (MODCOD) information relates to the receiving party which the data included in the transmitted packet is destined for. In yet further embodiments, where data processors are not used, MODCOD information may be sent from the network controller to encapsulation device 140, which may be further configured to use the appropriate MODCOD information based on destination analysis.

Each MODCOD combination, as described above, may be characterized by a different spectral efficiency figure, i.e. different number of user bits per transmitted symbol. Since MODCOD adaptability may be implemented on a frame-by-frame basis and since modulator 150, in most cases, may be configured to transmit at a constant preconfigured symbol rate, the channel's throughput depends on the number of frames transmitted using each MODCOD combination. Throughput may be higher as more frames are transmitted using more efficient MODCOD combinations, or lower as more frames are transmitted using more robust and less efficient MODCOD combinations.

In one aspect of this invention, encapsulation device 140 may be configured to calculate an average spectral efficiency figure for the transmission channel and thereafter use this average spectral efficiency figure for calculating the available user data throughput or bit rate.

Encapsulation device 140 may be configured to measure the actual user data throughput, e.g. by counting and/or calculating the number of user traffic bits or bytes being transmitted over a period of time. Encapsulation device 140 may be further configured to gather information on the current blend of MODCOD combinations, which may be used for transmitting the same user data traffic over the same period of time. As previously described, MODCOD information may be attached to each data packet arriving from the data processors or internally generated by encapsulation device 140 based on information received from a network controller. Using this MODCOD information, encapsulation device 140 may calculate the number of user traffic bits or bytes that were transmitted using each MODCOD combination. Having measured the actual user throughput and determining how many user traffic bits or bytes have been transmitted using each MODCOD combination, encapsulation device 140 may calculate the average spectral efficiency for the transmitted data.

Furthermore, knowing the preconfigured channel (symbol) rate, encapsulation device 140 may be configured to calculate the number of unused symbols (which may be filled either by modulator 150 with dummy frames or by encapsulation device 140 with null packets). Knowing the number of unused symbols per the measurement interval, encapsulation device 140 may further be configured to calculate the user traffic bit rate or throughput that may be accommodated by these unused symbols assuming the average spectral efficiency previously calculated is applicable to these symbols as well.

The above mechanism may be further described using the following example. Considering the following traffic being transmitted:

Port #1 of encapsulation device 140 may receive user traffic at a rate of 250 Kbytes per second (2 Mbps), out of which 100 Kbytes per second are transmitted using a QPSK 5/6 MODCOD combination and the remaining 150 Kbytes per second are transmitted using an 8PSK 2/3 MODCOD option.

Port #2 of encapsulation device 140 may receive user traffic at a rate of 250 Kbytes per second (2 Mbps), all of which is transmitted using an 8PSK 2/3 MODCOD option.

Encapsulation device 140 generates 1 Mbps worth of null packets, which are transmitted using a QPSK 1/4 MODCOD combination.

Considering only the user traffic on ports #1 and #2, and given that the spectral efficiency figures for QPSK 5/6 is 1.654663 and that of 8PSK 2/3 is 1.980636, the average spectral efficiency may be calculated as follows:

Average Spectral efficiency=(100K*1.654663+ 400K*1.980636)/500K=1.9154414

In addition, given a spectral efficiency figure of 0.490243 for the QPSK 1/4 MODCOD combination and the average spectral efficiency for user traffic as calculated above, the available bandwidth represented by the null packets may be calculated as follows:

Null Packets Bit Rate=(1M/0.490243) *1.9154414=3.907126 Mbps

Therefore:

Available Bit Rate=User Traffic Bit Rate+Null Packet Bit Rate

Available Bit Rate=2 Mbps+2 Mbps+3.907126 Mbps=7.907126 Mbs

In another aspect of this invention, a feedback path may exist between encapsulation device 140 and QoS enforcer 120. Encapsulation device 140 may be configured to use this feedback path for at least the purpose of sending the calculated available bit rate to QoS enforcer 120. Though there might be many appropriate methods for sending the available bit rate information to QoS enforcer 120, in some preferred embodiments this information may be encapsulated into an SNMP trap packet, which may be transmitted over a local LAN to which both devices may be connected.

Furthermore, QoS enforcer 120 may be configured to receive available bit rate information over a feedback channel and to reconfigure any of its internal software and/or hardware modules for at least the purpose of regulating its output bit rate according to the received available bit rate information. In some embodiments, QoS enforcer 120 may first serve preconfigured service level agreements (SLA) and high priority applications and only then allocate the remaining throughput to other applications, streams and/or traffic types. Thus, changes in the transmission channel's throughput may affect low priority traffic while SLA and high priority applications may continue to receive high quality of service (i.e. their required throughput).

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

We claim:

1. A method for dynamically controlling user data throughput over an adaptive transmission channel in a communication system comprising:
   determining, by a transmitter and based on an available bit rate for the adaptive transmission channel, a plurality of output bit rates for a plurality of data transmission users or applications serviced by the adaptive transmission channel;
   transmitting, by the transmitter, using the plurality of output bit rates and a plurality of current modulation and coding (MODCOD) combinations, data to the plurality of data transmission users or applications over the adaptive transmission channel;
   receiving, by the transmitter and based on one or more reception conditions at the plurality of data transmission users or applications serviced by the adaptive transmission channel, a plurality of updated MODCOD combinations for the plurality of data transmission users or applications serviced by the adaptive transmission channel;
   transmitting, by the transmitter and using the plurality of updated MODCOD combinations, additional data to the plurality of data transmission users or applications over the adaptive transmission channel;
   determining an updated available bit rate based in part on an amount of traffic transmitted using the plurality of updated MODCOD combinations, and further based on a spectral efficiency for the adaptive transmission channel that is determined based in part on the amount of traffic transmitted using the plurality of updated MODCOD combinations;
   determining, by the transmitter and based in part on the updated available bit rate, a plurality of updated output bit rates for the plurality of data transmission users or applications serviced by the adaptive transmission channel;
   and
   transmitting, by the transmitter and in accordance with the plurality of updated output bit rates, data to the plurality of data transmission users or applications over the adaptive transmission channel.

2. The method of claim 1, comprising:
   sending, by the transmitter and to a QoS enforcer, available bit rate information;
   receiving, by the QoS enforcer, the available bit rate information; and
   reconfiguring, by the QoS enforcer and in accordance with the received available bit rate information, one or more internal software or hardware modules to regulate its output bit rate.

3. The method of claim 1, wherein the communication system comprises a satellite communication system.

4. The method of claim 1, wherein determining the updated available bit rate comprises:
   transmitting the updated available bit rate for the adaptive transmission channel from the transmitter to a QoS enforcer.

5. The method of claim 4, wherein the updated available bit rate is received at the QoS enforcer encapsulated in a Simple Network Management Protocol (SNMP) trap packet sent by the transmitter over a local area network (LAN).

6. The method of claim 1, wherein determining the plurality of updated output bit rates comprises:
   determining one or more preconfigured service level agreements (SLAs) requiring bandwidth capacity over the adaptive transmission channel;
   determining one or more high priority applications requiring bandwidth capacity over the adaptive transmission channel; and
   allocating bandwidth capacity from the available bit rate for the adaptive transmission channel to the one or more preconfigured SLAs and the one or more high priority applications, before allocating bandwidth capacity to lower priority applications.

7. The method of claim 1, wherein transmitting, by the transmitter, data to the plurality of data transmission users or applications over the adaptive transmission channel comprises:
receiving, by the transmitter, a first data packet;
determining, by the transmitter, that the first data packet is destined for a first receiving party of a first data transmission user or application serviced by the adaptive transmission channel; and
transmitting, by the transmitter, using a received updated MODCOD combination for the first data transmission user or application serviced by the adaptive transmission channel to the first data packet.

8. A communication system configured to transmit user data over an adaptive transmission channel, the communication system comprising a transmitter including at least a quality of service (QoS) enforcer, wherein the transmitter is configured to:
determine, at the QoS enforcer and based on an available bit rate for the adaptive transmission channel, a plurality of output bit rates for a plurality of data transmission users or applications serviced by the adaptive transmission channel;
transmit, in accordance with the plurality of output bit rates and a plurality of current modulation and coding (MODCOD) combinations, data to the plurality of data transmission users or applications over the adaptive transmission channel;
receive, a plurality of updated MODCOD combinations for the plurality of data transmission users or applications serviced by the adaptive transmission channel, the plurality of updated MODCOD combinations based on one or more reception conditions at the plurality of data transmission users or applications serviced by the adaptive transmission channel;
transmit, in accordance with the plurality of updated MODCOD combinations, additional data to the plurality of data transmission users or applications over the adaptive transmission channel;
determine an updated available bit rate based in part on an amount of traffic transmitted using the plurality of updated MODCOD combinations, and further based on a spectral efficiency for the adaptive transmission channel that is determined based in part on the amount of traffic transmitted using the plurality of updated MODCOD combinations;
determine, based on the updated available bit rate, a plurality of updated output bit rates for the plurality of data transmission users or applications serviced by the adaptive transmission channel;
and
transmit, in accordance with the plurality of updated output bit rates, data to the plurality of data transmission users or applications over the adaptive transmission channel.

9. The communication system of claim 8, wherein determining the plurality of updated output bit rates for the plurality of data transmission users or applications serviced by the adaptive transmission channel comprises:
transmitting the updated available bit rate for the adaptive transmission channel from an encapsulation device in the transmitter to the QoS enforcer.

10. The communication system of claim 9, wherein the updated available bit rate is received at the QoS enforcer encapsulated in a Simple Network Management Protocol (SNMP) trap packet sent by the encapsulation device over a local area network (LAN).

11. The communication system of claim 8, wherein the communication system is further configured to:
determine one or more preconfigured service level agreements (SLAs) requiring bandwidth capacity over the adaptive transmission channel;
determine one or more high priority applications requiring bandwidth capacity over the adaptive transmission channel; and
allocate bandwidth capacity from the available bit rate for the adaptive transmission channel to the one or more preconfigured SLAs and the one or more high priority applications, before allocating bandwidth capacity to lower priority applications.

12. The communication system of claim 8, wherein the communication system comprises a satellite communication system.

13. The communication system of claim 8, wherein transmitting, by the transmitter, data to the plurality of data transmission users or applications over the adaptive transmission channel comprises:
receiving a first data packet;
determining that the first data packet is destined for a first receiving party of a first data transmission user or application serviced by the adaptive transmission channel; and
transmitting, using a received updated MODCOD combination for the first data transmission user or application serviced by the adaptive transmission channel, the first data packet.

* * * * *